US008023371B2

(12) United States Patent  (10) Patent No.: US 8,023,371 B2
Van De Pas et al.  (45) Date of Patent: Sep. 20, 2011

(54) OPTICAL DRIVE AND METHOD FOR DETERMINING A READING AND/OR WRITING POSITION

(75) Inventors: Joris Van De Pas, Eindhoven (NL); Joris Huibert Joseph Geurts, Eindhoven (NL); Michel Vervoort, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 450 days.

(21) Appl. No.: 12/161,874

(22) PCT Filed: Jan. 10, 2007

(86) PCT No.: PCT/IB2007/050067
§ 371 (c)(1),
(2), (4) Date: Jul. 23, 2008

(87) PCT Pub. No.: WO2007/085974
PCT Pub. Date: Aug. 2, 2007

(65) Prior Publication Data
US 2008/0316882 A1   Dec. 25, 2008

(30) Foreign Application Priority Data

Jan. 25, 2006  (EP) ...................................... 06100843

(51) Int. Cl.
*G11B 20/20* (2006.01)
(52) U.S. Cl. .................................................... 369/47.28
(58) Field of Classification Search ........................ None
See application file for complete search history.

(56) References Cited

U.S. PATENT DOCUMENTS

| 5,586,098 | A  | * | 12/1996 | Nishida et al. | ................ | 369/116 |
| 6,111,712 | A  |   | 8/2000  | Vishakhadatta et al. | | |
| 6,538,966 | B1 | * | 3/2003  | Hanks | ......................... | 369/47.28 |
| 7,023,773 | B2 | * | 4/2006  | Park | .......................... | 369/47.53 |
| 7,085,221 | B2 | * | 8/2006  | Lee et al. | .................... | 369/275.3 |
| 2004/0165497 | A1 | * | 8/2004 | Hirayama | ................... | 369/47.31 |

FOREIGN PATENT DOCUMENTS
EP  0920007 A2  6/1999
(Continued)

OTHER PUBLICATIONS

International Search Report of International Application No. PCT/IB2007/050067 Contained in International Publication No. WO2007085974, Jan. 25, 2006.

(Continued)

*Primary Examiner* — Joseph Feild
*Assistant Examiner* — Parul Gupta

(57) ABSTRACT

The invention relates to an optical drive (10) and a method for determining a reading and/or writing position of an optical drive (10). The optical drive (10) in accordance with the invention comprises control means (12) and at least three PLL units (20, 22, 24), wherein the control means (12) are adapted to control the three PLL units (20, 22, 24) to try to lock on to three different frequencies characteristic for an optical disc (26). The method in accordance with the invention comprises the step of controlling at least three PLL units (20, 22, 24) to try to lock on to three different frequencies characteristic for an optical disc (26). If the optical disc (26) is a Blue Ray Disc, the three different frequencies can be the HFM frequency, the wobble frequency, and the expected HF frequency.

9 Claims, 2 Drawing Sheets

FOREIGN PATENT DOCUMENTS

| | | |
|---|---|---|
| JP | 2002298366 | 10/2002 |
| JP | 2002298367 | 10/2002 |
| KR | 2002033921 A | 5/2002 |
| WO | WO2004066298 A1 | 8/2004 |
| WO | WO2005104120 A2 | 11/2005 |

OTHER PUBLICATIONS

Written Opinion of the International Searching Authority for International Application No. PCT/IB2007/050067, Jan. 10, 2007.

* cited by examiner

OPTICAL DRIVE AND METHOD FOR DETERMINING A READING AND/OR WRITING POSITION

FIELD OF THE INVENTION

The present invention relates to an optical drive for reading and/or writing optical discs, for example Blue Ray Disc or BDs. Furthermore, the present invention relates to a method for determining a reading and/or writing position of an optical drive.

BACKGROUND OF THE INVENTION

Optical drives usually are equipped with a laser which generates a laser beam that is focused on the optical disc by at least one lens. The lens can be moved in radial and vertical (focus) directions by or together with an actuator. These movements caused by the actuator are only small. To make it possible to cover the whole relevant area of the optical disc with the focused laser beam, the laser as well as the actuator are part of a so called optical pick up unit which is mounted on a sledge that is moveable in radial directions. The focused laser beam is reflected by the optical disc and reaches a photo detector. The photo detector usually consists of several photo diodes that generate electrical signals on the basis of the amount of light which they receive. These electrical signals are processed and filtered in various ways. It is known to feed output signals into (among others) two PLL units and into a servo system.

PLL stands for Phase Lock Loop and such a PLL unit is used to try to determine the frequency of an incoming signal. To determine the frequency of the incoming signal within a certain frequency range, the PLL unit tries to lock on to the incoming signal by a lock on process. At the end of this lock on process the PLL unit can inform whether it was able to lock on to the incoming signal, and, if yes, the frequency of the incoming signal. In principle the lock on process can be executed in two ways. With the so called auto-lock process the PLL unit performs the lock on process autonomously. With the so called preset process the target or presetting frequency is provided to the PLL unit, wherein the presetting frequency is typically in the middle of the expected frequency range. The presetting process is usually faster than the auto-lock process.

For example in connection with Blue Ray Discs, the task of one PLL unit can be to detect the frequency of the HF signal (if present), and the task of the other PLL unit can be to detect the frequency of a wobble signal associated to a wobbled pre-groove.

The servo system is used to let the focused laser beam follow the track. This is realized by moving the lens by or with the actuator in radial and vertical directions and by moving the sledge carrying the actuator. The movement of the sledge can be monitored such that the actual position of the sledge is known during operation. However, as regards the actual position of the lens, the position information available for the sledge is not very accurate. This is particularly due to the fact that the motor assigned to the sledge works in discrete steps and that the actuator does also influence the position of the lens.

It is the object of the present invention to provide an optical drive and a method capable to accurately determine the reading and/or writing position, particularly—but without being limited thereto—when a Blue Ray Disc (BD) is used.

SUMMARY OF THE INVENTION

In accordance with a first aspect of the present invention this object is solved by an optical drive comprising control means and at least three PLL units, wherein the control means are adapted to control the three PLL units to try to lock on to three different frequencies characteristic for an optical disc. For example the three different frequencies can be characteristic for different areas of the optical disc. In such a case, for example, the transition from one area to another area and thereby the actual reading and/or writing position can be accurately determined because one PLL unit will lose its lock with reference to a first frequency, while another PLL unit will be able to lock on to a second frequency. The third PLL unit, for example, can stay locked on to the third frequency which is characteristic for both areas of the optical drive. The control means can be realized by any adequate circuitry known to the person skilled in the art. For example, a microprocessor can interact with adequate software and data. Furthermore, it should be clear that one or more of the three different frequencies can depend on the actual reading and/or writing position, i.e. the actual radius, and/or the actual rotation speed of the optical disc. If, for example, the sledge of the optical drive is moved from radius 29 mm to 58 mm (and the rotation speed of the optical disc is maintained), then the frequency of some signals can become twice as large. On the other hand, if the rotation speed is doubled (and the sledge position is maintained), then the frequency of some signals can also becomes twice as large. Therefore, the control means are preferably adapted to consider these dependencies, for example by applying one or more dynamic preset frequencies to one or more of the PLL units.

With preferred embodiments of the optical drive in accordance with the invention, the control means are adapted to control a first PLL unit to try to lock on to a first frequency characteristic for a lead-in area of the optical disc. Such a lead-in area can be provided in the central area of the optical disc, while a lead-out area can be provided in the outer circumferential area of the optical disc. Between the lead-in area and the lead-out area the data area is usually provided.

It is particularly preferred that the first frequency is the modulation frequency of a high frequency modulated (HFM) groove provided in the lead-in area of the optical disc. For example with Blue Ray Discs, the lead-in area comprises a specific so called PIC area (Permanent Information and Control data sub-are) with a pre-recorded HFM groove instead of a wobbled groove which is used in the data area. If the first PLL unit is able to lock on to the HFM frequency it is clear that the PIC reading position has been reached, and thus, the PIC can be read.

Furthermore, it is preferred that the control means are adapted to control a second PLL unit to try to lock on to a second frequency characteristic for a data area of the optical disc. For example, if the first PLL unit looses its lock to the HFM frequency and the second PLL unit is able to lock on to the frequency characteristic for the data area, it is clear that the data area has been reached and that reading and/or writing data can be started.

For example, in connection with Blue Ray Discs the second frequency is preferably the wobble frequency of a wobbled groove provided in the data area of the optical disc. The wobble signal can be used for addressing, amongst others.

Furthermore, it is regarded as advantageous that the control means are adapted to control a third PLL unit to try to lock on to a third frequency characteristic for a bit stream of data provided on the optical disc. This third frequency can, for example, be the frequency of the HF signal that is expected when a Blue Ray Disc is used.

From the above it can be seen that it is preferred that the control means are preferably adapted to determine the actual reading and/or writing position on the basis of the results to try to lock on to the different frequencies. It is not compulsory that the reading and/or writing position is determined over the whole area of the optical disc. In some cases it might be sufficient to accurately determine only transitions between different areas of the disc.

In accordance with a second aspect of the present invention there is provided a method for determining a reading and/or writing position of an optical drive, wherein the method comprises the step of controlling at least three PLL units to try to lock on to three different frequencies characteristic for an optical disc. Also in this case the three different frequencies can, for example, be characteristic for different areas of the optical disc. In such a case, as mentioned in connection with the optical drive in accordance with the invention, the transition from one area to another area and thereby the actual reading and/or writing position can be accurately determined because one PLL unit will lose its lock with reference to a first frequency, while another PLL unit will be able to lock on to a second frequency. The third PLL unit, for example, can stay locked on to third frequency which is characteristic for both areas of the optical drive.

In this context it is preferred that the step of controlling the at least three PLL units to try to lock on to three different frequencies characteristic for an optical disc comprises:

presetting a first PLL unit to a first frequency which corresponds to a pre-recorded HFM-groove expected on the optical disc;

presetting a second PLL unit to a second frequency which corresponds to a wobble frequency of a wobbled groove expected on the optical disc;

presetting a third PLL unit to a third frequency which corresponds to a HF frequency of data expected on the optical disc, and waiting until at least one of the three PLL units is in lock or a time limit has expired.

The pre-recorded HFM-groove can, for example, be arranged in a lead-in area of the disc to provide the PIC of a Blue Ray Disc. The wobbled groove can, for example, be provided in the data area of a Blue Ray Disc. Finally, the HF frequency can, for example, be associated to the expected data bit stream when a Blue Ray Disc is read.

As may be seen from the above, it is preferred that the method in accordance with the invention comprises the following step:

determining a reading and/or writing position on the basis of the results to try to lock on to the different frequencies.

It is a gist of the present invention that it is, for example, possible to lock on to the HF frequency and/or the HFM frequency and/or the wobble frequency of a Blue Ray Disc, if three PLL units are used. Thereby, the lock status of the three PLL units gives a direct feedback of the current position on the optical disc. Since the three PLL units preferably try to lock on more or less simultaneously, it is possible to read data provided on different areas of the optical disc without delay.

These and other aspects of the invention will be apparent from and elucidated with reference to the embodiments described herein after.

DESCRIPTION OF THE PREFERRED EMBODIMENTS

Figure 1:
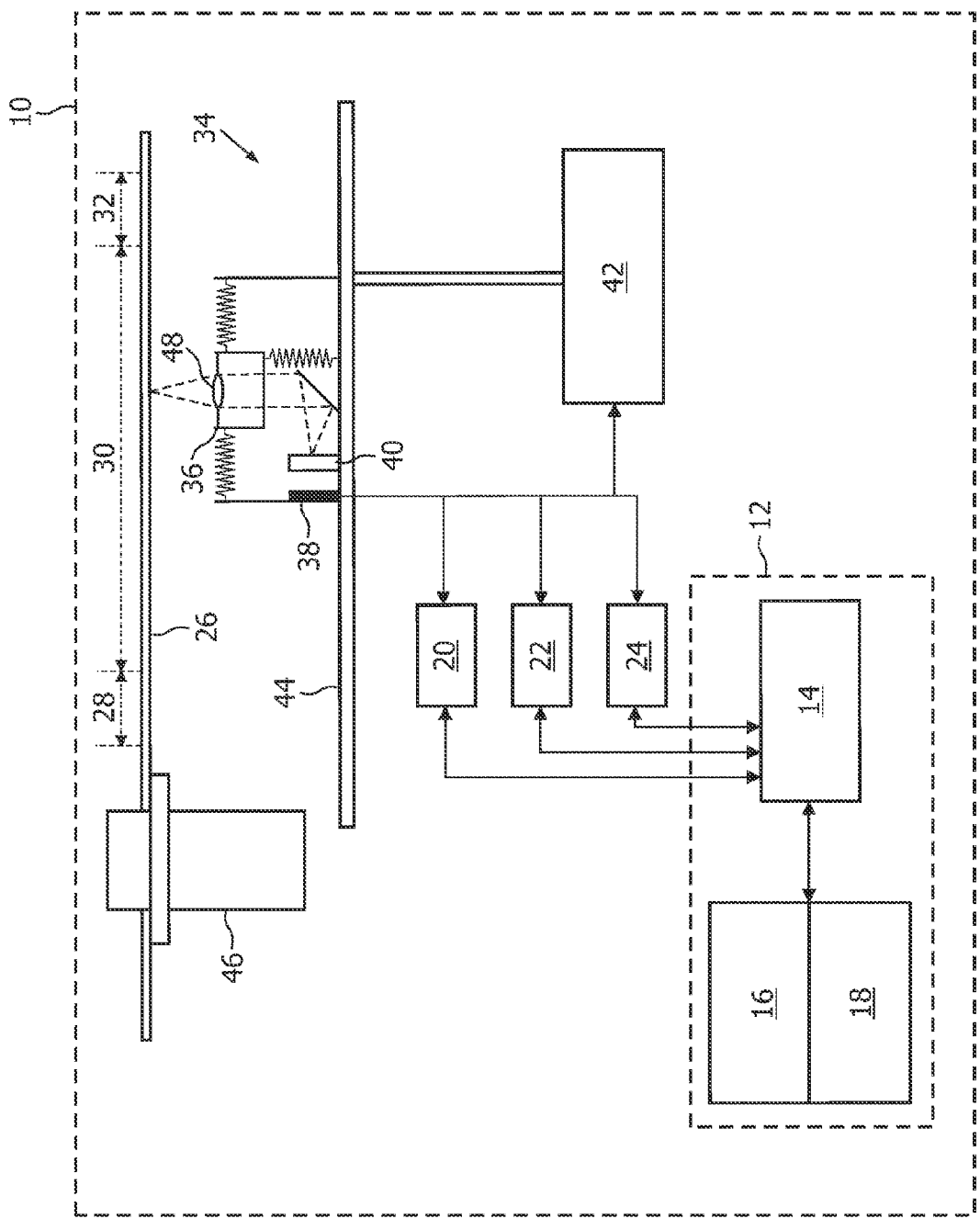
FIG. 1 shows a block diagram of an embodiment of an optical drive in accordance with the invention, wherein the illustrated optical drive is capable to carry out the method in accordance with the invention.

FIG. 1 shows an optical drive 10 in accordance with the present invention in form of a simplified block diagram, wherein only those parts are shown that are necessary to understand the present invention. The illustrated optical drive 10 comprises a turntable motor 46 for rotating an optical disc 26 inserted into the optical drive 10. Furthermore, a laser 40 is provided which generates a laser beam that is focused on the optical disc 26, a Blue Ray Disc in the present example, by a lens 48. The lens 48 can be moved in radial and vertical (focus) directions by actuator 36. These movements caused by the actuator 36 are only small. To make it possible to cover the whole relevant area of the optical disc 26 with the focused laser beam, the laser 40 as well as the actuator 36 are part of an optical pick up unit 34 which is mounted on a sledge 44 that is moveable in radial directions. The focused laser beam is reflected by the optical disc 26 and reaches a photo detector 38. The photo detector 38 consists of several photo diodes (not shown) that generate electrical signals on the basis of the amount of light which they receive. These electrical signals are processed and filtered in various ways, wherein only the signal processing relevant to understand the present invention is indicated in FIG. 1. At least one output signal of the photo detector 38 is fed to a first PLL unit 20, a second PLL unit 22, and a third PLL unit 24, wherein the three PLL units 20, 22, 24 interact with control means 12. In the present example, the control means 12 comprise a microprocessor 14 which is capable to interact with a FLASH memory 16 and a SDRAM 18. Furthermore, the output signal of the photo detector 38 is fed to a servo system 42. The servo system 42 is used to let the focused laser beam follow the track on the optical disc 26. This is realized by moving the lens 48 by or with the actuator 36 in radial and vertical directions and by moving the sledge 44 carrying the optical pick up unit 34. As it is known in the art, the movement of the sledge 44 can be monitored such that the actual position of the sledge 44 is approximately known during operation. However, as regards the actual position of the lens 48, the position information available for the sledge 44 is not very accurate. This is particularly due to the fact that the motor assigned to the sledge 44 works in discrete steps and that the actuator 36 does also influence the position of the lens 48. This inaccurate knowledge of the actual reading and/or writing position of the laser beam can, for example, cause problems, when the laser beam reaches the border between different areas of the optical disc 26. For example, a recordable Blue Ray Disc comprises a lead-in area 28, a data area 30, and a lead-out area 32. The lead-in area 28, amongst others, comprises a pre-recorded HFM groove for providing the PIC. This HFM groove has a different format than the wobble pre-groove provided in the data area 30.

Therefore, if, like in the prior art, only two PLL units are present and one of these PLL units is preset to the wobble frequency while the other PLL unit is preset to the expected HF frequency, it is not possible to retrieve the PIC. On the other hand, if one PLL unit is preset to HFM frequency, problems occur when the data area 30 is reached, since no PLL unit can lock on to the wobble frequency. To automatically change the preset frequency of one PLL unit when the data area 30 begins is also not possible, since, as mentioned above, the position information available for the sledge 44 is not accurate enough.

To overcome these problems, the optical drive 10 in accordance with the invention comprises three PLL units 20, 22, 24. The control means 12 control the PLL units 20, 22, 24 such that the first PLL unit 20 tries to lock on to the HFM frequency of the lead-in area 28, the second PLL unit 22 tries to lock on to the wobble frequency of the data area 30, and the third PLL unit tries to lock on to the expected HF frequency. If the first PLL unit 20 is able to lock on to the HFM frequency, the PIC can be read. If the first PLL 20 looses its lock and the second PLL unit 22 is able to lock on to the wobble frequency, the actual read and/or write position, i.e. the transition between the lead-in area 28 and the data area 30, is accurately known and the reading and/or writing of the user data can be started without delay. In general, when a PLL unit reports that it was able to lock on (while it was not in lock before) or that is has lost the lock (while it was in lock before), appropriate actions can be taken. This is particularly due to the fact that, dependant on which PLL unit is in lock, it is always known which area of the optical disc 26 is hit by the focused laser beam.

Figure 2:
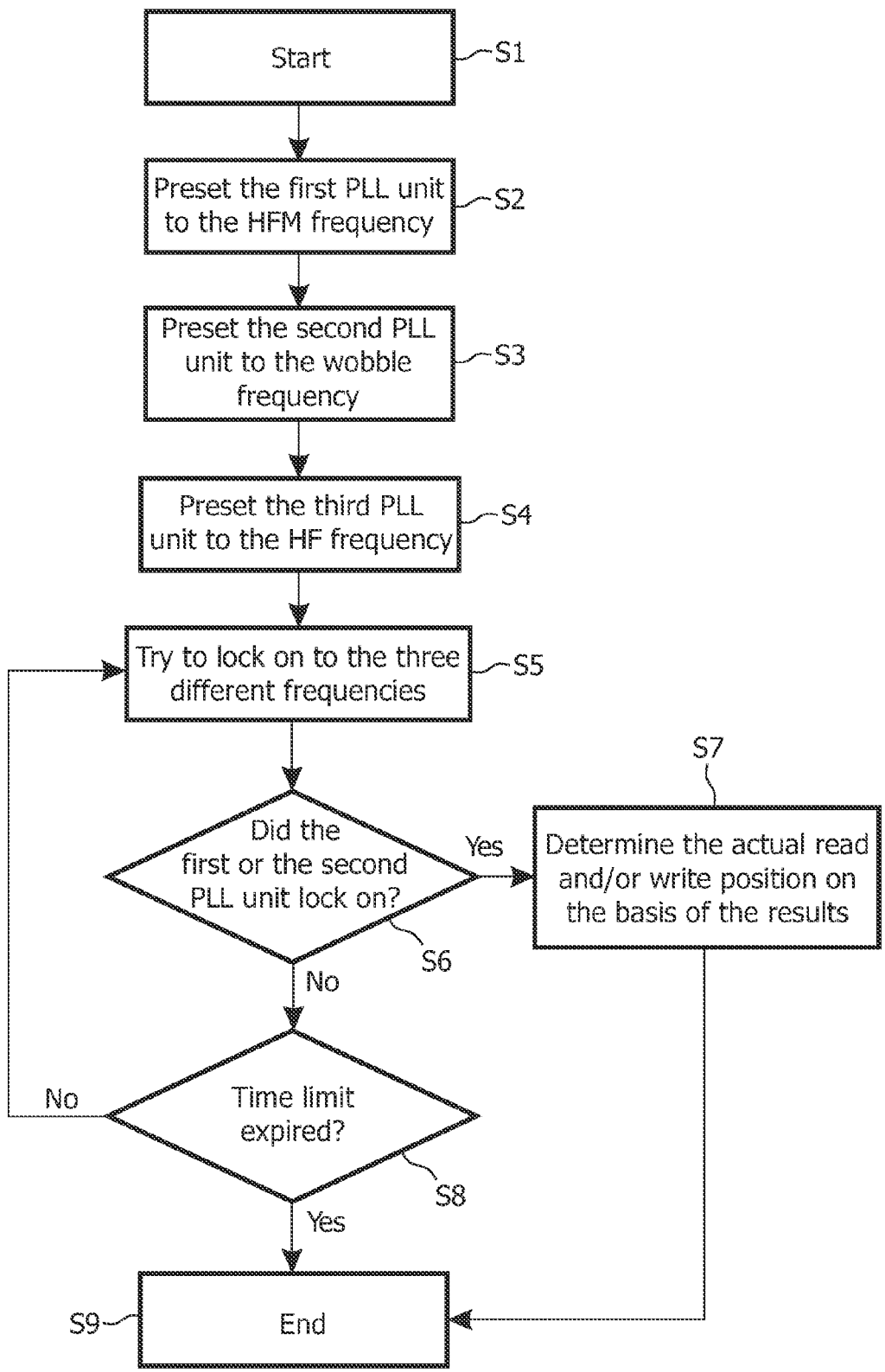
FIG. 2 shows a flowchart illustrating an embodiment of the method in accordance with the invention.

FIG. 2 shows a flowchart illustrating an embodiment of the method in accordance with the invention.

The illustrated method starts in step S1.

In step S2 the first PLL unit 20 is preset by the control means 12 to the HFM frequency.

In step S3 the second PLL unit 22 is preset by the control means 12 to the wobble frequency.

In step S4 the third PLL unit 24 is preset by the control means 12 to the expected HF frequency.

In step S5 the three PLL units 20, 22, 24 try to lock on to the respective preset frequencies.

In step S6 it is checked whether the first PLL unit 20 or the second PLL unit 22 is locked on.

If this is the case, the actual read and/or write position, for example the transition between the lead-in area 28 and the data area 30 of the optical disc 26 is determined in step S7.

If neither the first PLL unit 20 nor the second PLL unit 22 was able to lock on in step S6, it is checked in step S8 whether a predetermined time limit has expired.

If the predetermined time limit has expired in step S8, the method ends in step S9. If not, the PLL units 20, 22, 24 continue to try to lock on in step S5.

Equivalents and modifications not described above may also be employed without departing from the scope of the invention, which is defined in the accompanying claims. Furthermore, in the accompanying claims reference numerals are provided exclusively for an easier understanding of the claims. It is not intended in any way that these reference numerals shall limit the scope of the invention.

The invention claimed is:

1. An optical drive for reading or writing an optical disc by means of a laser beam, the optical disc comprising:
   a first area with a first frequency which corresponds to a pre-recorded HFM-groove expected on the optical disc,
   a second area with a second frequency which corresponds to a wobble frequency of a wobbled groove expected on the optical disc and
   a third area with a third frequency which corresponds to a HF frequency of data expected on the optical disc,
   wherein the first, second and third frequencies are different from each other and characteristic of the respective first, second and third areas of the optical disc,
   wherein each of said first, second and third frequencies are associated with a reading and/or writing position of the laser beam,
   control means (12) and
   at least three PLL units
   wherein the control means are adapted to control the three PLL units to try to lock on to a different one of the first, second and third frequencies, and,
   wherein the control means are arranged to indicate to the optical drive the reading and/or writing position of the laser beam based on a change in obtained locks indicating the occurrence of a transition between areas of the optical disc with different characteristic frequencies.

2. The optical drive according to claim 1, wherein the control means are adapted to control a first PLL unit to try to lock on to a first frequency characteristic for a lead-in area of the optical disc.

3. The optical drive according to claim 2, wherein the first frequency is the modulation frequency of a high frequency modulated groove provided in the lead-in area of the optical disc.

4. The optical drive according to claim 1, wherein the control means are adapted to control a second PLL unit to try to lock on to a second frequency characteristic for a data area of the optical disc.

5. The optical drive according to claim 4, wherein the second frequency is the wobble frequency of a wobbled groove provided in the data area of the optical disc.

6. The optical drive according to claim 1, wherein the control means are adapted to control a third PLL unit to try to lock on to a third frequency characteristic for a bit stream of data provided on the optical disc.

7. The optical drive according to claim 1, wherein the control means are adapted to determine the reading and/or writing position on the basis of the results to try to lock on to the different frequencies.

8. A method for determining a reading and/or writing position of an optical drive, wherein the method comprises:
   controlling at least three PLL units to try to lock on to three different frequencies characteristic for an optical disc, comprising:
   presetting a first PLL unit to a first frequency which corresponds to a pre-recorded HFM-groove expected on the optical disc;
   presetting a second PLL unit to a second frequency which corresponds to a wobble frequency of a wobbled groove expected on the optical disc;
   presetting a third PLL unit to a third frequency which corresponds to a HF frequency of data expected on the optical disc, and
   waiting until at least one of the three PLL units is in lock or a time limit has expired, and
   wherein the lock status of the three PLL units provides a direct feedback of the current position on the optical disc,
   wherein the first, second and third frequencies are different from each other and characteristic of the respective first, second and third areas of the optical disc, and
   wherein each of said first, second and third frequencies are associated with a reading and/or writing position of the laser beam.

9. The method of claim 8, further comprising, determining that the current reading and/or writing position is in transition between the lead-in area and the data area of the optical disc, in the case where the first PLL unit loses its lock and the second PLL unit gains its lock.

* * * * *